United States Patent [19]
Phillips

[11] Patent Number: 5,067,902
[45] Date of Patent: Nov. 26, 1991

[54] MULTIFUNCTIONAL BLOCK AND KIT FOR SCIENCE INSTRUCTION

[76] Inventor: Thomas G. Phillips, R. R. #3, P. O. Box 577, Arthur, Ontario, Canada, N0G 1AO

[21] Appl. No.: 464,227

[22] Filed: Jan. 12, 1990

[51] Int. Cl.⁵ ............................................. G09B 23/00
[52] U.S. Cl. .......................................... 434/276; 446/1
[58] Field of Search ............... 434/300, 302, 303, 276, 434/281; 446/126, 1, 118, 105; 206/575, 579, 232; 273/148 A

[56] References Cited

U.S. PATENT DOCUMENTS

| | | | |
|---|---|---|---|
| 1,608,592 | 11/1926 | Funk | 446/126 |
| 2,803,088 | 8/1957 | Swann | 446/126 |
| 3,145,482 | 8/1964 | Edwards | 434/281 |
| 3,518,787 | 7/1970 | Anello et al. | 446/118 X |
| 3,562,926 | 2/1971 | Koral | 434/300 X |
| 3,657,838 | 4/1972 | Hanning et al. | 446/126 |
| 3,747,261 | 7/1973 | Salem | 446/126 X |
| 3,797,132 | 3/1974 | Lawlor et al. | 434/300 |
| 4,188,734 | 2/1980 | Rich | 434/172 |
| 4,470,821 | 9/1984 | Le Caplain | 424/172 |
| 4,961,500 | 10/1990 | Coulombe | 206/232 X |

FOREIGN PATENT DOCUMENTS 1054419 1/1967 United Kingdom ................ 434/300

OTHER PUBLICATIONS

"Girder & Panel Building Sets", *Playthings*; Aug. 1960, p. 56.
Radio Shack Advertisement; "Washington Post"; Apr. 4, 1976.
"Tinker Toys" Advertisement; Mar. 3, 1958.

*Primary Examiner*—Richard J. Apley
*Assistant Examiner*—Rachel M. Healey
*Attorney, Agent, or Firm*—James W. Carson

[57] ABSTRACT

The present invention relates to educational and demonstration devices for the instruction of basic scientific principles. The present invention consists of a kit for science instruction which comprises a multifunctional support block, activity cards containing directions for setting up and conducting experiments and a selection of accessory items. The accessory items can include gears, mirrors, ramps, dowelling, magnets, metal rods, weights, balloons, paper clips, string, tape, tacks, rubber bands, washers, straws, pins, moulds and cloth patches.

2 Claims, 3 Drawing Sheets

MULTIFUNCTIONAL BLOCK AND KIT FOR SCIENCE INSTRUCTION

BACKGROUND OF THE INVENTION

1. Field of the Invention

This invention relates to educational and demonstration devices for the instruction of basic scientific principles. The invention further provides a multifunctional support element which can be used in a wide variety of experiments and activities.

2. Description of the Prior Art

The use of supports for classroom science equipment is known. U.S. Pat. No. 3,520,981 for an "APPARATUS FOR CLASSROOM PHYSICS EXPERIMENTS" and U.S. Pat. No. 1,849,305 for an "EXPERIMENTAL DERRICK AND LADDER ASSEMBLY" are examples of devices used for classroom that instruction include supports. However the supports described in these patents are designed solely for particular applications and are not multifunctional.

SUMMARY OF THE INVENTION

It is an object of the invention to provide an inexpensive yet entirely adequate means for alleviating a perceived lack of materials for science instruction at the elementary school level.

Furthermore, it is an object of the invention to help eliminate the need for many different and separate pieces of equipment for conducting different experiments and activities.

Yet another object of the invention is to provide a science kit that encourages students to direct their own learning. In this regard, there are activity cards in the kit of the present invention which allow the students to study varied activities on their own without the need for a teacher's constant supervision. The students are, as much as possible, left to their own devices to pursue all the roads that the kit and their own imagination and initiative take them.

It is yet another object of the invention to provide a multifunctional support and focal point for the use of materials commonly found in the classroom yet sometimes not thought of as science apparatus. For example, bristol board, drinking straws, paper clips and assorted containers become part of a science learning process centred around the support and the kit.

Further objects of the invention include the fostering of planning skills and problem solving. Students are left to their own devices and of necessity must plan to find the answers to the questions on the activity cards.

Thus in accordance with the present invention there is provided a kit for elementary science instruction comprising a multifunctional support means, activity cards containing instructions for setting up and conducting experiments and a variety of ancillary components selected from the group consisting of gears, mirrors ramps, dowelling, pegs, balls, screws, pulleys, lexan sheets, iron filings, magnets, metal rods, weights, washers, balloons, paper clips, string, tape, tacks, rubber bands, straws, pins marbles and cloth patches. The support means preferably comprises a block made of wood, plastic or like material having a plurality of slots and holes in its top, bottom and side walls, said slots and holes of various sizes and shapes for retaining and supporting one or more of the ancillary components.

In another aspect the present invention provides a multifunctional support for science experiments said support comprising a rectangular block having a plurality of different sizes and shapes of slots and holes in the top, bottom and side walls of said block for retaining and supporting a variety of other objects. The slots and holes are also provided at different angles to support the other objects at various angles.

The general concept residing in the device is the provision of a "MULTIFUNCTIONAL BLOCK AND KIT" that fulfils the objects of the invention as set out above. As implied by the Prior Art section above, this inventive concept is not known to be part of the prior art.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

The preferred embodiment of the invention is a kit which includes a block.

Figure 1:
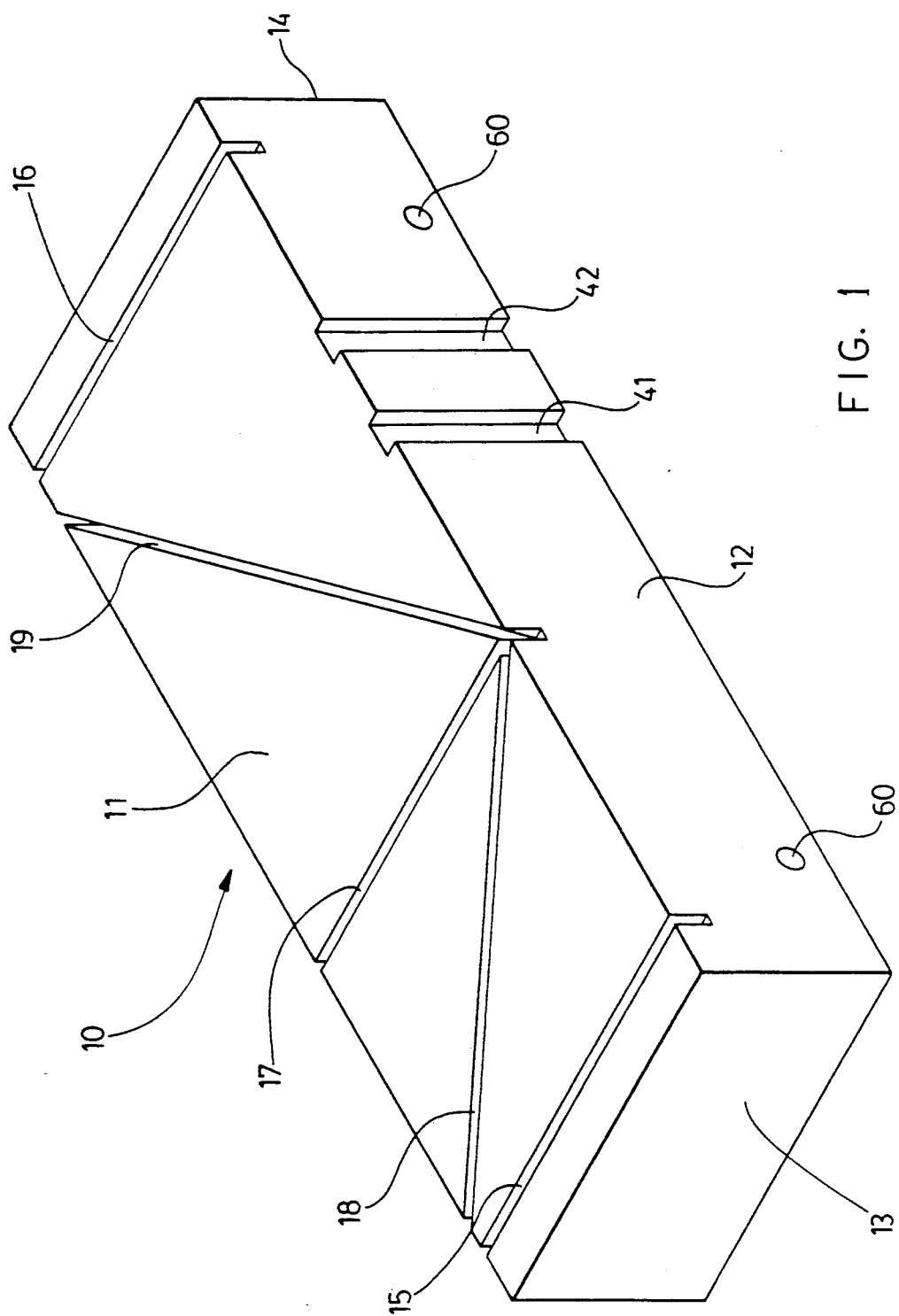
FIG. 1 is a perspective of the preferred embodiment of the multifunctional support means of the present invention

With reference to FIG. 1, the block 10 of the preferred embodiment is about 23 cm×9 cm×4.5 cm. Preferably, the block 10 is made of wood or plastic but can be made of any suitable material.

Generally speaking, when a particular side of the block is in use that side faces upward. As a matter of convenience, the sides will be identified as top side 11, bottom side 20, front side 12, back side 62, left end 13 and right end 14.

Figure 2:
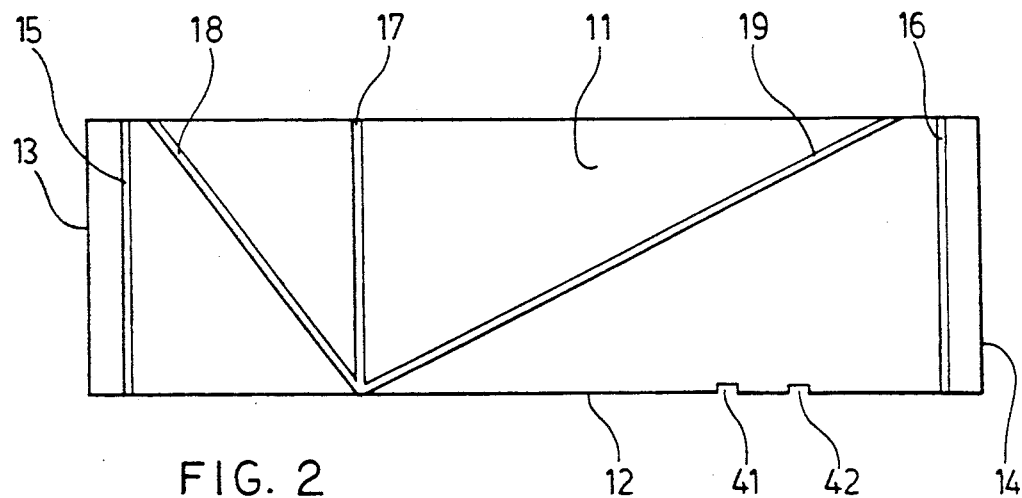
FIG. 2 is a top plan view of the block of FIG. 1

FIG. 2 is a plan view of the top 11 of the block 10. There is a left slot or groove 15 parallel to and approximately 1 cm from the left end 13 the block. Similarly, there is a right slot or groove 16 parallel to and approximately 1 cm from the right end 14 of the block. Between and parallel to the left slot 15 and the right slot 16 is a middle slot 17. A 30 ^ O degree slot 18 extends from the front of the middle slot 17 to the left across the width of the block 10 and forms an angle of thirty degrees with the middle slot 17. A 60 ^ O degree slot 19 similarly extends from the front of the middle slot 17 to the right and forms an angle of sixty degrees with the middle slot. The left slot 15 and right slot 16 intersect the back side 62 of the block adjacent to the pants where the 30 O degree slot 18 and the 60 ^ O degree slot 19 respectively intersect the back side 62 of the block. Preferably, the middle slot 17 is approximately 8.5 cm from the left end 13 of the block.

Figure 7:
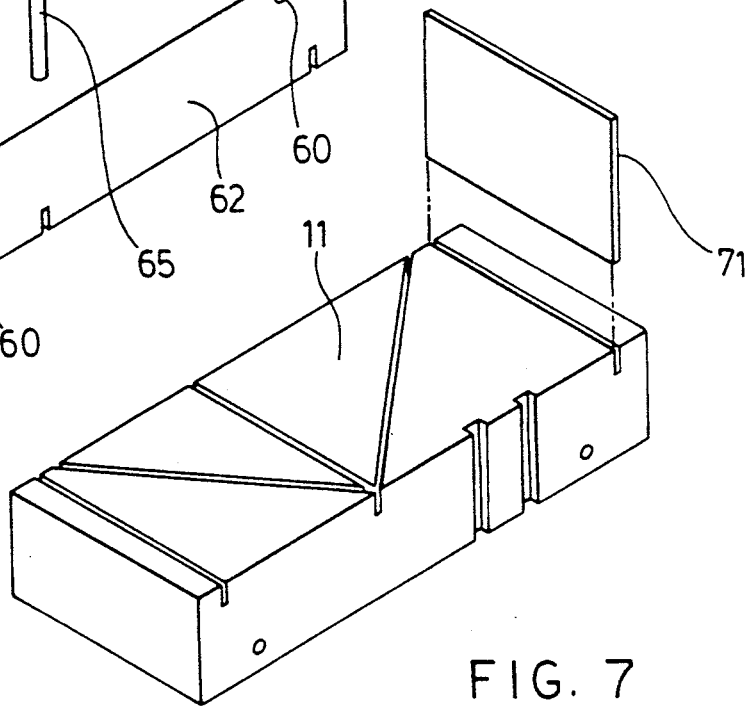

The slits serve to hold rectangular pieces of cardboard or mirror on edge as illustrated in FIG. 7.

Figure 6:
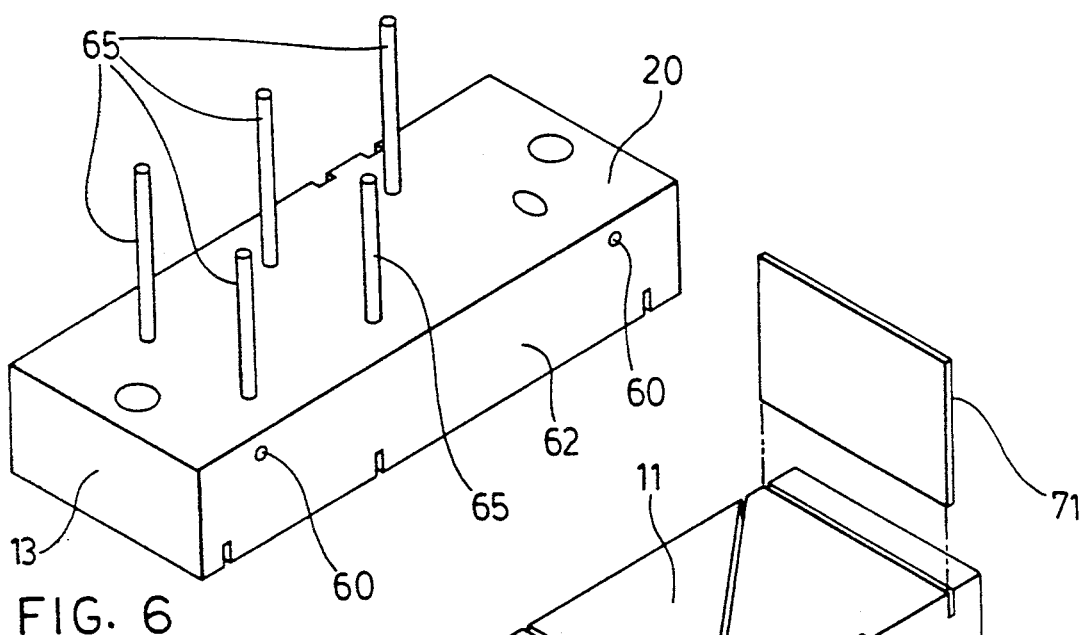
FIG. 6 and 7 illustrate the block of FIG. 1 supporting various components.

FIG. 6 shows the back 62 of the block. Two circular holes 60 approximately 0.6 cm diameter are drilled 1 cm from the bottom side 20 and respectively 3 cm from the left end and the right end. The holes are adapted to receive pegs or other components.

Figure 4:
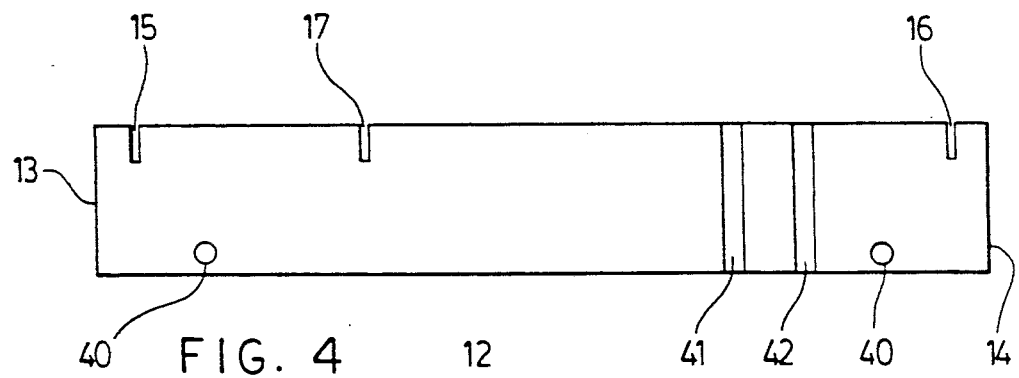
FIG. 4 is a front plan view of the block of FIG. 1

FIG. 4 depicts a plan view of the front 12 of the block. There are holes 40 corresponding to the circular holes 60 on the back of the block.

The front 12 of the block also has two wide slots, 41 and 42, parallel to the left end 13 and right end 14 of the block and adapted to receive components such as a bar magnet. Preferably, the centre lines of the slits are respectively 6 cm and 8.5 cm from the right end 14 of the block.

Figure 3:
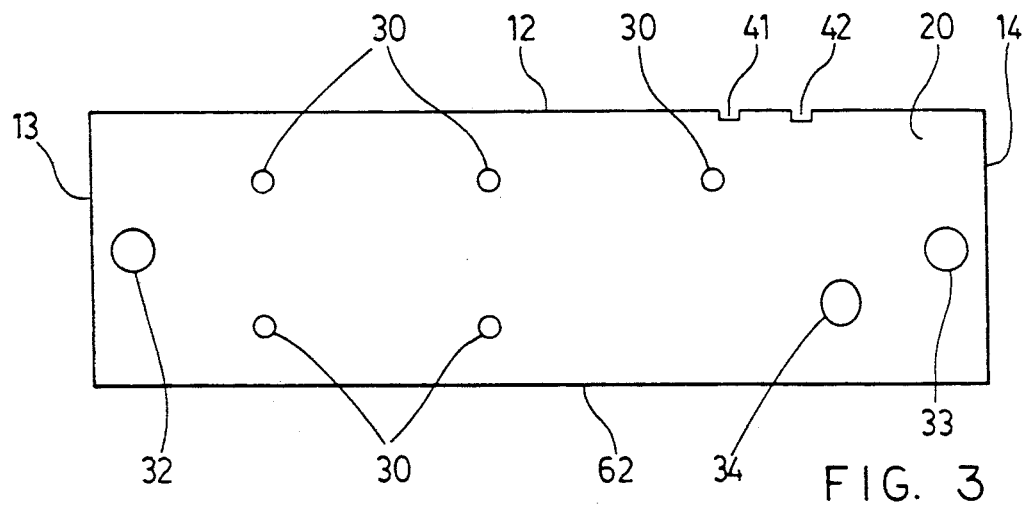
FIG. 3 is a bottom plan view of the block of FIG. 1

FIG. 3 depicts a plan view of the bottom 20 of the block. There are 4 bottom peg holes 30 arranged to form a square. A fifth bottom peg hole 31 is located to the right of the square a distance equal to the length of one side and aligned with the front side of the square. The bottom peg holes closest to the left end of the block are preferably 4.5 cm from the left end. The bottom peg holes are approximately 5.5 cm apart.

The bottom peg holes are meant to hold pegs for gears, pulleys, wheels and rubber bands as illustrated in FIG. 6.

In addition to the bottom peg holes 30 and 31 there are also two vertical dowel holes 32 and 33 adjacent to each end of the block. Preferably, the vertical dowel holes are centred between the front and back sides 1.5 cm from each end and approximately 1.2 cm in diameter.

Figure 5:
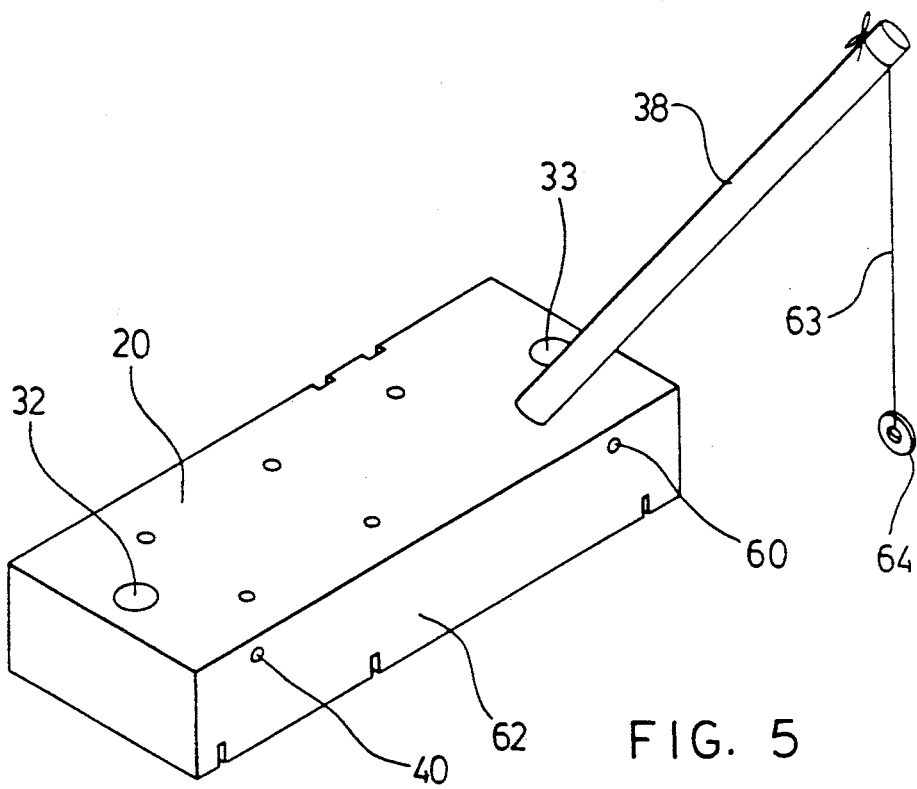
FIG. 5 is a perspective view of the bottom and back of the block of FIG. 1 supporting a piece of dowelling

Another feature of the bottom side is an inclined dowel hole 34. Preferably, the inclined dowel hole 34 is equal in diameter to the vertical dowel holes 32 and 33 (1.2 cm) and is inclined towards the back 62 approximately 60° degrees to the vertical. The inclined dowel hole is adapted to receive one of the dowels 38. As shown in FIG. 5, the inclined dowel hole can be used to support a dowel 38 with a pendulum tied to the elevated extremity.

In the preferred embodiment the science kit of the present invention includes the following items in addition to the block:

4 pegs, 3 dowels, 1 box of activity cards, 3 gears, 2 mirrors, a ramp, 2 dowels (12mm or 0.5 inches), 1 dowel (6mm or 0.25 inches), 4 short pegs, 2 table tennis balls, 1 large wooden screw and 4 wheels/pulleys, a sheet of lexan, iron filings, 2 bar magnets with magnetized faces, 2 round magnets, 2 metal rods, 1 box miscellaneous, 2 weights (fishing sinkers), washers, 2 balloons, 2 bulldog clips, string, scotch tape, thumbtacks, paper clips, rubber bands, square of cloth, drinking straws, straight pins, marble.

Many activities can be conducted using the kit and the following examples would be included with the activity cards of the present invention:

ACTIVITIES

Activity 1: Barometer

Materials Required:
The Science Block
Balloon
Glass jar, or plastic yogurt cup
Elastic band
Straw
Glue

Procedure

1. Cut one side of balloon down the middle. Stretch it over the top of the glass jar or plastic cup. Hold it in place with the rubber band.
2. Spread a thin layer of glue across the middle of the stretched balloon. Glue one end of the straw so that the straw extends horizontally beyond the edge of the cup.
3. Tape a 5×9 cm. piece of bristol board on the left end 13 of the block.
4. Put the straw pointing towards the bristol board and mark the scale where the top of the straw meets the bristol board.
5. Keep a daily record of the changes in the position of the pointer.
6. Should there be dramatic and sudden changes in the weather, take more frequent readings.

Activity 2: Weather Vane

Materials required:
The Science Block
⅛" dowel with hole in the top. Get metric equivalent of ¼" straight pin.
straw
bristol board

Procedure

1. Insert the dowel vertically into one of the holes 32 in the bottom 20 of the block.
2. Cut out an arrow tail in bristol board (7 cm.)
3. Slit the straw at one end about 2 cm. long.
4. Glue the arrow tail into the slit in the straw.
5. Find the balance point of the straw and put a straight pin through the straw at the balance point.
6. Stick the pin in top of the dowel.

Activity 3: Balance

Materials required:
The Science Block
String
2 dowels
Peg
Paper Clips
2 Containers

Procedure

1. Insert dowel into a hole 32 in the bottom of the block.
2. Put a peg near the top of dowel.
3. Place the middle of a second dowel over the peg to form a cross.
4. Bend paperclips over both ends of cross dowel. Hang the containers by string from the ends of the horizontal dowel.
5. Balance the beam by moving the paper clips.

Activity 4: Balance 2

Materials required:
The Science Block
2 large dowels
2 paperclips
weights or washers

Procedure

1. Place one dowel into a hole in the bottom of the block and attach on a peg the other dowel at the top of the first dowel to form a +balance.

2. Hook a weight onto a paper clip.
3. Slip the other end of the paper clip through the "eye" on one end of the balance.
4. Do the same to the other end of the balance.

Activity 5: Ramp

Materials required:
The Science Block
Dowelling
Pegs

Procedure

1. Attach the ramp to a peg so that the peg extends beyond the edge of the ramp block.
2. Line up a hole in the side of the block and insert the peg.
3. The ramp can be lowered or raised by lowering or raising the peg or turning the block on its end.

Activity 6: Pendulum

Materials required:
The Science Block
Dowel
Washer
String

Procedure

1. Place a dowel into the 60 O degree hole 34 in the block as shown in FIG. 5.
2. Tie a string to the end of the dowel and a washer to the other end of the string.

Activity 7: Gears

Materials required:
Science Block
3 Pegs
3 cogs

Procedure

1. Find two holes in your block that are close together and insert pegs into the holes 30 provided in the bottom of the block.
2. Place gears over the pegs making sure all the gears mesh.

Activity 8: Spring or Elastic Scale

Materials required:
The Science Block
1 Peg
Washers
1 graduated scale made from bristol board.
String
1 small container
Thumb Tacks
Elastic band or spring

Procedure

1. Tack a 5 cm×9 cm. sheet of bristol board onto the bottom of the block and set the block on its end 14.
2. Place a peg in a hole 30 above the bristol board.
3. Hang elastic or spring on the peg.
4. Suspend a small container on the elastic with a paper clip and string.
5. Graduate the scale by putting different numbers of washers into container.

Activity 9: Magnetic Field

Materials required:
The Science Block
2 bar magnets
1 clear plastic sheet

Procedure

1. Slide the two bar magnets into the wide slots 41 and 42 in the block and set the block on its back side so the slots are facing up.
2. Place a clear plastic sheet on top of the magnets.
3. Sprinkle iron filings onto the plastic sheet.

Activity 10: Crane

Materials required:
The Science Block
Two $\frac{1}{2}$" dowels (metric equivalent)
1 Peg
String

Procedure

1. Insert a $\frac{1}{2}$" dowel vertically into the hole 32 on the bottom of the block.
2. Put a peg through the bottom hole in the second dowel and into a hole in the vertical dowel.
3. Tie a string to the eye hook in the top of the second dowel adjacent its free end and run the string through a second eye hook in the top of the first dowel.
4. Tie a short piece of string to an eye hook adjacent the free end of the second dowel and on its underside and a hook or magnet on the other end of the short string.
5. Raise and lower the crane and the 'load'.

Activity 11: Block Clock

Materials required:
Block
Coat Hanger
2 Sheets of White Paper
Thin Dowel

Procedure

1. Cut a sheet of white paper the same size as the block. Tape the sheet on the top of the block.
2. Tape a dowel at one end of the top of the block so that half of the dowel extends over the front side of the block.
3. When the sun is shining, place the block on another sheet of white paper.
4. Face the block towards the sun.
5. Mark the spot where the shadow falls onto the paper taped to the block.
6. Make a mark every half hour.

Activity 12: An Elevator

Materials required:
Science Block
String
Elastic Band
Small Box (match box size)
2 Pulleys

Procedure

1. Insert 2 pegs in the holes in the back side of the block.
2. Place pulleys over the 2 pegs.
3. Cut 2 lengths of string 30 cm. long.
4. Tie the 2 strings to the elastic band.
5. Punch a hole in the ends of the small box.

6. Thread the strings through the holes and the knots on the ends.
7. Put the string over the pulleys and tighten by winding around the bottom pulley.
8. Attach a 30cm. length of string to the top of the small box.
9. Run the 30 cm. string over pegs 1 and as in the diagram and attach a weight.
10. Turn the pulley and your elevator should move up and down.

Activity 13: Thaumatrope

Materials Required
Block
2 Large dowels
2 Rubber Bands
Bristol board 8 cm.×8 cm.

Procedure

1. Draw an animal on one side of the cardboard.
2. On the other side of the cardboard draw vertical lines.
3. Punch 2 holes in the cardboard one at the midpoint of either end of the cardboard.
4. Connect the 2 rubber bands to the cardboard and to the dowels one of which inserted into holes 30 in the bottom of the block.
5. Wind up the rubber bands and let the card spin.
6. Discuss what you see and the reasons why.

Activity 14: At the Movies

Materials Required:
1. Cut a piece of cardboard the same width as your block. And a height of 18 cm.
   10 cm. from the bottom of the cardboard cut out a viewing window, 4 cm. high 12 cm. long
   Tape the cardboard to the front of your block.
   Cut strips of white paper about 5 cm. wide and as long as you want.
   Draw a story on your strip, something similar to the comic strips.
   When the story is complete tape one end of the story to a dowel so that it will be seen through the hole in the cardboard.
   Roll it up loosely onto the dowel.
   Tape the other end to a second dowel.
   Place both dowels into the holes 32 in the block. By turning both dowels the "movie" can be shown.

Activity 15: Planetarium

Materials Required:
The Science Block p1 Styrofoam balls (different sizes)
Dowelling
Pegs

Procedure

1. Place vertical dowel in a hole in the bottom of the block.
2. Place peg in top of dowel.
3. Slip large round "wheel" over peg.
4. Insert large wire, flattened end into the slit in "wheel".
5. Place small piece of dowel over vertical piece of wire and slip another piece of wire horizontally through the small dowel. Place the "moon" and earth on the ends of the wire.
6. Finally place sun on the vertical dowel.

Activity 16: Measuring the Height of the Sun Above the Horizon, in Degrees

Materials Required:
The Science Block
2 Dowels
3 Small Pieces of Bristol Board
Plumb Line (a string tied to a nut)
Pegs

Procedure

1. Using your protractor mark off a quarter circle with a 5 cm radius and mark the degrees $0^\wedge O$ to $90^\wedge O$ along the edge of the circle. Cut it out.
2. Attach the ¼ circle at right angles to a piece of dowelling.
3. Cut out 2 squares of bristol board 3 cm.×3 cm. Mark one of them with a cross in the centre and in the other punch out a small hole in the middle.
4. With glue, thumbtacks or plasticine attach them to the ends of the dowelling. Put a vertical piece of dowelling in the block.
5. Using a peg attach the dowelling that holds the card board and protractor onto the vertical dowelling.
6. Tie the plumbline to peg.
7. At midday, each day, place the device in such a way that a beam of sunlight shines through the hole and onto the middle of the cross.
8. Hold the cross member in that position and read the degrees registered by the plumbline. That is the number of degrees the sun is above the horizon.

Activity 17: Experiment 6

Materials Required:
The Science Block
Dowelling
String
Washers

Procedures

1. Suspend two pendulums of the same weight but different lengths, about 2 cm. apart.
2. Start both swinging together. Count the number of oscillations of each pendulum.
3. Record your findings and graph your results.
4. How many oscillations did it take for the two pendulums to swing together again.

Activity 18: Experiment 7

Materials Required:
The Science Block
Dowelling
String
Washers

Procedure

1. Suspend two pendulums of the same length and weight.
2. Wrap a dowel around the two strings.
3. Hold pendulum A still.
4. Pull pendulum B back.
5. Release both together.
6. Record what happens. Explain the results.

Activity: Experiment 8

Materials Required:
The Science Block

Dowelling
String
Washers

Procedure

1. Using 2 blocks, tie a string between the two upright dowels.
2. Tie two identical plumblines to the string about 30 cm. apart.
3. Keep one still while you start the second one swinging.
4. What happens. (One transfers energy to the other).
5. Record your findings and explain the results.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A science kit comprising a multifunctional support means consisting of a block having a plurality of slots and holes in its top, bottom, front, back and side walls, a plurality of ancillary components selected from the group consisting of gears, mirrors, ramps, dowelling, magnets, metal rods, weights, washers, balloons, paper clips, string, tape, tacks, rubber bands, straws, pins, moulds and cloth particles and activity cards containing instructions for setting up and conducting experiments utilizing the multifunctional support means and the ancillary components wherein the sots and holes in the block are of various sizes and shapes for retaining and supporting one or more of the ancillary components.

2.

* * * * *